350-390 SR

OR 3,814,502 ~~T 40TTC~~ T 4023H

WP

United States Patent [19]

Barkley

[11] 3,814,502

[45] June 4, 1974

[54] HEAT TREATED FERROELASTIC ALPHA-LEAD STRONTIUM PHOSPHATE CRYSTALS HAVING CONTROLLED DOMAIN WALL ORIENTATION

[75] Inventor: John R. Barkley, Wilmington, Del.

[73] Assignee: E. I. du Pont de Nemours and Company, Wilmington, Del.

[22] Filed: Oct. 27, 1972

[21] Appl. No.: 301,540

[52] U.S. Cl. ................ 350/150, 423/306, 23/293 R

[51] Int. Cl. ................ G02f 1/26

[58] Field of Search .......... 23/293 R, 295; 423/305, 423/306; 350/149, 150

[56] References Cited

UNITED STATES PATENTS

| | | | |
|---|---|---|---|
| 2,706,326 | 4/1955 | Mason | 23/293 R |
| 3,701,585 | 10/1972 | Barkley et al. | 350/150 |
| 3,732,549 | 5/1973 | Barkely | 350/150 |
| 3,744,875 | 5/1972 | Haertling | 350/150 |

*Primary Examiner*—Norman Yudkoff
*Assistant Examiner*—F. Sever

[57] ABSTRACT

A crystal of α-lead phosphate having planar domain walls in at least two different directions is heated to establish a temperature gradient such that the isotherms are essentially planar and the Curie temperature isotherm crosses the crystal so that a region of the crystal containing only a single set of domain walls remains below the Curie temperature, the domain walls being at a large angle to the isotherm. On cooling so that the Curie point isotherm moves laterally through the plate, the domain walls extend behind the isotherm to cover the plate. Crystals so poled can be utilized in optical switches and line scanners wherein the crystal plate is switched from one strain state to another by lateral motion of the domain walls.

3 Claims, 6 Drawing Figures

HEAT TREATED FERROELASTIC ALPHA-LEAD STRONTIUM PHOSPHATE CRYSTALS HAVING CONTROLLED DOMAIN WALL ORIENTATION

FIELD OF THE INVENTION

This invention relates to a method of treating crystals of α-lead phosphate having ferroelastic properties whereby the domain walls separating ferroelastic domains are oriented in a single direction.

BACKGROUND OF THE INVENTION

Ferroelasticity was first recognized by Aizu, J. Phys. Soc. Japan, 27, (1969). According to Aizu a crystal is said to be ferroelastic when it has two or more spontaneous strain orientation states in the absence of mechanical stress and can be shifted from one orientation state to another by mechanical stress. The states are identical or enantiomorphous in crystal structure and different in spontaneous mechanical strain tensor at null mechanical stress. A plot of stress versus strain for such materials exhibits a hysteresis loop similar to that of ferromagnetic materials. Also like ferromagnetic materials, ferroelastic materials usually exhibit a Curie temperature above which the ferroelastic properties are absent and a new phase of different crystal structure is present.

Ferroelastic materials are divided into domains throughout which the strain tensor is the same. Domains which differ in the strain tensor interface at one of two possible, mutually perpendicular domain walls which are strongly confined to crystallographic planes, in contrast to ferromagnetic domain walls, and which are highly planar. Switching is generally accomplished by motion of the domain walls in a direction perpendicular to their plane.

The different strain states are thermodynamically equivalent and equally stable. The phenomenon of switching takes place because the energy barrier between the states is small. This implies that the ferroelastic strain states are each a slightly distorted form of a certain prototype state of higher symmetry. In most cases the prototype state is the state of the crystal above the Curie point transition temperature. The symmetry of the prototype state can be deduced from the symmetry of the ferroelastic state and the domain structure. [Aizu, J. Phys. Soc. Japan, Vol. 27, 387 (1969)] and hence the possible species possessing ferroelasticity can be classified in terms of the point group symmetry of the prototype and the point group symmetry of the ferroelastic species. In Aizu's notation, the point group symmetry of the prototype species is first written followed by F and the symmetry of the ferroelastic species. The prototype structure, in most instances, is the actual point group symmetry of the paraelastic phase above the Curie temperature. Conversely, following the procedure employed by Shuvalov, J. Phys. Soc. Japan 28, Supplement 38 (1970), for ferroelectric materials, the domain structures and domain wall orientations can be deduced from the symmetry of the prototype point group and the point group of the ferroelastic phase.

In our laboratories, lead phosphate has now been found to be a pure ferroelastic material. Above the Curie temperature, $T_c$, of 179° C the symmetry is $3m$ and changes to $2/m$ below the Curie temperature. On cooling through $T_c$, a strain occurs in one of the three equivalent mirror planes of the high temperature trigonal phase resulting in one of three possible orientations for the monoclinic axis of the low-temperature form. Throughout a ferroelastic domain the monoclinic axes have the same orientation. Each pair of domains differ in strain direction. i.e., their monoclinic axis have two different orientations; and they interface at one of two possible mutually perpendicular walls, which lie along the bisectors of the strain axis of the domains interfaced. Since each of three different domain pairs can interface with two different walls a total of six wall orientations are possible.

The walls divide into two types, three $n$ walls oriented essentially perpendicular to the $b$–$c$ plane of the ferroelastic phase (corresponding to the $c$ plane of the trigonal form) and each oriented at 60° to the $a$–$c$ plane of each domain and three $t$ walls each tilted at an angle of about 73° to the $b$–$c$ plane and oriented at 30° to the $a$–$c$ plane.

The unit cell dimensions of the high temperature and low temperature forms have been determined by Keppler. Z. fur Krist. 132, 228–235 (1970) who found $c = 20.30 \pm 0.05$ A, $a = 5.53 \pm 0.02$ A for the trigonal form based on a hexagonal unit cell and $a = 13.816 \pm 0.035$ A, $b = 5.692 \pm 0.015$ A, $c = 9.429 \pm 0.024$ A, $\beta = 102.36 \pm 0.05°$ for the monoclinic form.

Lead phosphate is transparent between 0.28$\mu$ and 5$\mu$ and has a refractive index of 2.1 ±0.05 at 5,550 A. The domains are biaxially birefringent with the optic axes lying in the $a$–$c$ mirror plane of the monoclinic structure. The birefringence in the $b$–$c$ plane is $\Delta n = 7 \times 10^{-3}$ and is optically negative. The material is thus useful for the construction of mechanically actuated optical switches and for optical line scanners.

In our laboratory we have also discovered new ferroelastic materials isomorphous with α-lead phosphate composed of α-lead phosphate in which part of the lead is substituted with strontium.

As usually obtained single crystals of lead phosphate are multidomain, and generally contain domains of differing orientations which interlock and prevent domain wall motion. The crystals cannot be poled by simple mechanical pressure except in rare cases. It is, therefore, desirable to provide a method whereby the domain walls present are oriented in a single direction.

SUMMARY OF THE INVENTION

The process of the present invention is a method of converting single crystals of a substance having the formula

$$Pb_{3-x}Sr_x(PO_4)_2$$

wherein $x$ is from 0 to 0.8 and having domain walls oriented in more than one direction to a form in which substantially all of the domain walls are in a single direction by heating the crystal to establish a temperature gradient of preferably not more than 10° C/cm. and having essentially linear isothermals whereby a portion of the plate containing only selected domain walls in a single direction remains below the Curie temperature, the single direction being at a large angle preferably greater than 45° to the isothermals, and then cooling the crystal so that the isothermals move substantially perpendicular to their length whereby the portion of the plate below the Curie temperature increases and the selected domain walls extend in length, and con-tinuing to cool until all of the crystal is below the Curie temperature.

THE DRAWINGS AND DETAILED DESCRIPTION OF THE INVENTION

This invention will be better understood by reference to the drawings which accompany this specification. In the drawings.

Figures 1, 4A:
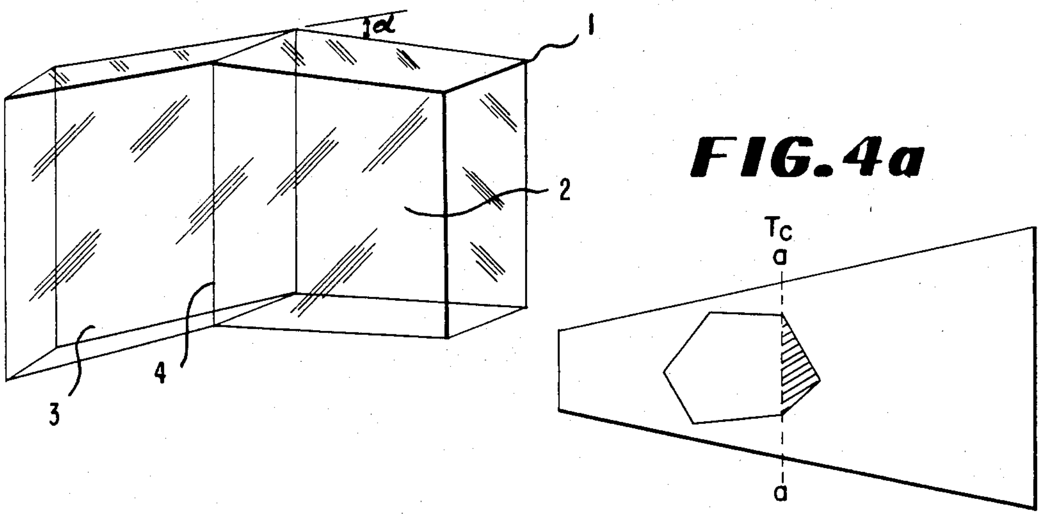
FIG. 1 shows a plate of α-lead phosphate having a single domain wall.

FIG. 4*a* shows the crystal plate of FIG. 2 which has been heated on the hot stage of FIG. 3 so that only a region having domain walls in a single orientation remains below the Curie temperature.

Figure 4B:
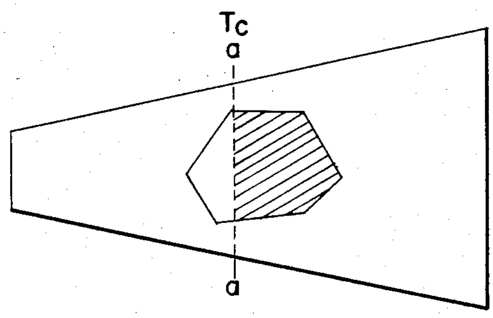

FIG. 4*b* shows the crystal of FIG. 2*a* after partially cooling below the Curie temperature.

Figure 2:
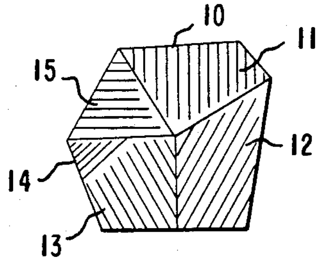
FIG. 2 shows a plate of α-lead phosphate having a number of domain walls in various orientations.
Figures 3, 4C:
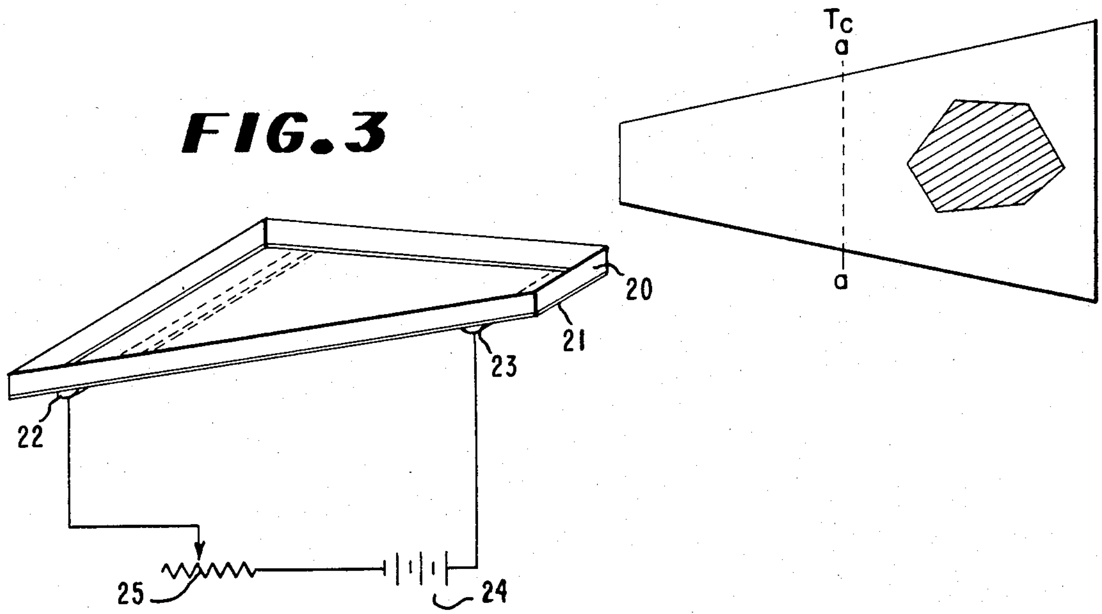
FIG. 3 shows a heating stage suitable for use, in conjunction with a polarizing microscope for poling crystals according to the method of the present invention.

FIG. 4*c* shows the crystal of FIGS. 2*a* and 2*b* after the entire crystal has cooled below the Curie temperature.

Referring now to FIG. 1, there is shown a plate composed of a single crystal of α-lead phosphate having two domains 2 and 3 separated by an *n* domain wall. The spontaneous strain appears as a bend α of about 4.4° and a bend β of about 1.6° in the plane of the crystal. A t wall is included to the plane of the plate at an angle of 73°, α is 4.6° and β is 0°. The crystal can be switched from one strain state to the other by lateral motion of the domain wall. Domain walls can move completely out of the crystal or merge with domain walls of the same orientation. For use in optical devices it is generally desired to obtain a crystal as shown in FIG. 1 wherein only a single domain wall is present.

FIG. 2 shows a crystal plate of α-lead phosphate cut parallel to the *c* crystallographic planes and hence perpendicular to the domain walls. The plate exhibits five regions 11, 12, 13, 14 and 15 in which the domain walls are in differing directions. Usually each such region will have a number of parallel domain walls as illustrated in the figure. Such a crystal plate cannot be converted to a state wherein substantially all of the domain walls are parallel by the application of stress since the incompatible strains tend to shatter the crystal.

FIG. 3 shows a heating stage for use in the process of the present invention to produce a controlled temperature gradient in a crystal plate which is adapted for use with a polarizing microscope to permit observation of the domain structure. The stage consists of a thin, suitably 1/8 inch, heat resistant glass plate 20 cut to a wedge shape as shown in FIG. 3. A transparent tin oxide electrode 21 is deposited on the bottom of the plate, and is connected at the ends by silver paste electrodes 22 and 23 to a variable voltage source represented in FIG. 3 by a battery 24 and a rheostat 25. The stage is heated by the electric current passing through the tin oxide film. The shape causes the current density to increase toward the narrow end of the wedge and thus creates a temperature gradient along the stage.

The use of the hot stage of FIG. 3 in poling a crystal plate such as the plate of lead phosphate illustrated in FIG. 2 is shown in FIGS. 4*a* and 4*b* and 4*c*. The stage is first placed under a low-power polarizing microscope so that the domain structure of the crystal plate to be poled can be observed in polarized light. The stage is then heated so that the temperature at the center of the stage is about the Curie temperature, 170° C for lead phosphate. The plate to be poled is then heat-sinked to the hot stage at the cooler end with a bath of silicone oil and oriented so that a substantial region containing only parallel domain walls is adjacent the cool end of the heating stage. The region should preferably be chosen so that extension of the domain walls will substantially cover the entire plate. The plate is then pushed along the hot stage until all of the regions containing domain walls of unwanted orientation are above the Curie temperature. The Curie temperature isotherm can be readily visuallized as the locus of termination of the domain walls in the selected region and should be a straight line directed at a large angle to the domain walls. The angle need not be a right angle and can be as little as about 45°. The crystal will then appear as in FIG. 4*a* wherein the Curie point isotherm is indicated by the dotted line *a—a*. The crystal is then pushed back towards the cool end of the stage avoiding rotation so that the Curie point isothermal moves through the crystal in a direction perpendicular to its length. The domain walls extend in length behind the moving Curie point isothermal as shown in FIG. 4*b* until all of the crystal has cooled below the Curie temperature when the poling process is completed as shown in FIG. 4 *c*.

Instead of moving the crystal plate, the current to the hot stage can be reduced, and the entire plate permitted to cool.

The time required to cool the plate is not critical. Usually the poling process can be accomplished in a few seconds, but longer cooling times can also be employed.

The temperature gradient along the heating stage is likewise not highly critical. The domain walls have been found to "follow" the Curie point isotherm with quite large temperature gradients, however, it is important that the isotherms in the crystal and particularly the Curie point isotherm be essentially linear. Curvature of the isotherm tends to produce domain walls of unwanted orientation. This condition is difficult to achieve with large temperature gradients and accordingly the temperature gradient should not exceed about 10° C/cm. The temperature gradient is determined by the taper of the wedge heating stage.

The above described poling process is not invariably successful. Domain walls of unwanted orientation occasionally appear due to lack of uniformity of the thermal gradient, or from the presence of physical defects in the plate particularly at the edges. Repetition of all or part of the poling process may be needed. Occasionally reorientation of the crystal and the selection of a different set of domain walls can be employed to achieve the desired result. Further the application of external stress in the form of a compression along the direction of the desired domain walls is helpful in achieving the desired result. External stress applied parallel to the desired domain wall direction can also be employed in conjunction with cooling with the use of a temperature gradient to assist the process of obtaining domain walls of a single orientation.

It is not essential to completely pole the crystals thermally provided that domain walls of unwanted orientation occupy only minor regions of the crystal. Such walls can be removed by the application of stress below the Curie temperature.

Once the crystal has been converted to a form in which substantially all of the domain walls are parallel, the number of domain walls can be reduced by the application of stress so that excess walls move out of the crystal or annihilate each other. Usually, for optical switches and the like only a single domain wall dividing the crystal plate into two domains is required as shown in FIG. 1. The single domain wall can be retained in the crystal and the production of unwanted domain walls inhibited by cementing rigid clamps such as glass plates to the crystal having straight edges traversing the crystal parallel to the domain wall and defining an unclamped region of the plate on which the domain wall is free to move. The clamps should be cemented with a hardenable fluid cement which does not produce stress on hardening such as an α-cyanoacrylate cement. The ferroelastic plate can then be employed in a variety of devices such as optical switches, shutters, line scanners, mechanical transducers and the like.

While the above description has been limited to α-lead phosphate, the procedure described therein is also applicable to the isomorphous lead strontium phosphates.

Since obvious modifications and equivalents in the invention will be evident to those skilled in the arts, I propose to be bound solely by the appended claims.

The embodiments of the invention in which an exclusive property or privilege is claimed are defined as follows:

1. A method of treating a single crystal of a material having the formula $$Pb_{3-x}Sr_x(PO_4)_3$$

wherein $x$ is from 0 to 0.8 having domain walls dividing the crystal into ferroelastic domains, said domain walls being oriented in more than one direction, whereby a crystal having domain walls substantially all in a single direction is produced which comprises heating said crystal to establish a temperature gradient having essentially planar isothermals whereby a portion of the crystal containing only selected domain walls in a single direction remains below the Curie temperature, said domain walls being at a large angle to said isotherm, and cooling said crystal so that the isotherms move substantially perpendicular to their length whereby the selected walls extend in length, and continuing to cool until all of the crystal is below the Curie temperature.

2. Method of claim 1 wherein said selected domain walls are at an angle of at least about 45° to the isotherm).

3. Method of claim 2 wherein said temperature gradient is less than 10° C/cm.

* * * * *